(12) United States Patent
Bai et al.

(10) Patent No.: US 12,165,347 B2
(45) Date of Patent: Dec. 10, 2024

(54) ROBOTIC CONTROL BASED ON 3D BOUNDING SHAPE, FOR AN OBJECT, GENERATED USING EDGE-DEPTH VALUES FOR THE OBJECT

(71) Applicant: GOOGLE LLC, Mountain View, CA (US)

(72) Inventors: Yunfei Bai, Fremont, CA (US); Yuanzheng Gong, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/199,303

(22) Filed: May 18, 2023

(65) Prior Publication Data

US 2023/0289988 A1   Sep. 14, 2023

Related U.S. Application Data

(63) Continuation of application No. 16/424,363, filed on May 28, 2019, now Pat. No. 11,657,527.

(51) Int. Cl.
*G06T 7/593* (2017.01)
*B25J 9/16* (2006.01)
(Continued)

(52) U.S. Cl.
CPC ............. *G06T 7/593* (2017.01); *B25J 9/1661* (2013.01); *B25J 9/1697* (2013.01); *G06F 18/24* (2023.01); *G06T 5/94* (2024.01); *G06T 7/12* (2017.01); *G06T 7/13* (2017.01); *G06T 7/521* (2017.01); *H04N 23/90* (2023.01);
(Continued)

(58) Field of Classification Search
None
See application file for complete search history.

(56) References Cited

U.S. PATENT DOCUMENTS

| 4,821,212 A | 4/1989 | Heartz |
| 6,028,606 A | 2/2000 | Kolb et al. |

(Continued)

OTHER PUBLICATIONS

European Patent Office; International Search Report and Written Opinion issued in Ser. No. PCT/US2020/034753; 15 pages; dated Nov. 10, 2020.

(Continued)

*Primary Examiner* — Edemio Navas, Jr.
(74) *Attorney, Agent, or Firm* — Gray Ice Higdon (57) ABSTRACT

Generating edge-depth values for an object, utilizing the edge-depth values in generating a 3D point cloud for the object, and utilizing the generated 3D point cloud for generating a 3D bounding shape (e.g., 3D bounding box) for the object. Edge-depth values for an object are depth values that are determined from frame(s) of vision data (e.g., left/right images) that captures the object, and that are determined to correspond to an edge of the object (an edge from the perspective of frame(s) of vision data). Techniques that utilize edge-depth values for an object (exclusively, or in combination with other depth values for the object) in generating 3D bounding shapes can enable accurate 3D bounding shapes to be generated for partially or fully transparent objects. Such increased accuracy 3D bounding shapes directly improve performance of a robot that utilizes the 3D bounding shapes in performing various tasks.

18 Claims, 6 Drawing Sheets

(51) Int. Cl.
| | |
|---|---|
| *G06F 18/24* | (2023.01) |
| *G06T 5/00* | (2024.01) |
| *G06T 5/94* | (2024.01) |
| *G06T 7/12* | (2017.01) |
| *G06T 7/13* | (2017.01) |
| *G06T 7/521* | (2017.01) |
| *H04N 23/90* | (2023.01) |

(52) U.S. Cl.
CPC ............... *G06T 2207/10024* (2013.01); *G06T 2207/10028* (2013.01); *G06T 2207/10048* (2013.01)

(56) References Cited

U.S. PATENT DOCUMENTS

| | | | | |
|---|---|---|---|---|
| 6,757,446 | B1* | 6/2004 | Li | G06T 15/205 345/647 |
| 2011/0122251 | A1* | 5/2011 | Schmidt | G06V 10/143 348/E5.09 |
| 2017/0316253 | A1* | 11/2017 | Phillips | G06V 20/647 |
| 2018/0139436 | A1 | 5/2018 | Yucer et al. | |
| 2018/0232052 | A1 | 8/2018 | Chizeck et al. | |
| 2019/0080503 | A1* | 3/2019 | Bhowmick | G06T 15/08 |
| 2019/0147245 | A1 | 5/2019 | Qi et al. | |
| 2019/0195619 | A1 | 6/2019 | Kress et al. | |
| 2019/0302259 | A1* | 10/2019 | Van Fleet | G05D 1/0255 |
| 2020/0301885 | A1 | 9/2020 | Zweigle et al. | |
| 2020/0306980 | A1 | 10/2020 | Choi et al. | |
| 2020/0309520 | A1 | 10/2020 | Nagai et al. | |
| 2020/0376675 | A1 | 12/2020 | Bai | |
| 2020/0388004 | A1* | 12/2020 | Zhang | G06T 7/33 |
| 2021/0171283 | A1* | 6/2021 | Deacon | B62L 3/00 |

OTHER PUBLICATIONS

Houben, Q. et al., "A Multi-Feature Stereo Vision System for Road Traffic Analysis;" 2016 IEEE Conference on Computer Vision and Pattern Recognition (CVPR); pp. 554-559; Feb. 1, 2009 Feb. 1, 2009.

Chen, X. et al., "Monocular 3D Object Detection for Autonomous Driving;" 2016 IEEE Conference on Computer Vision and Pattern Recognition (CVPR); pp. 2147-2156; Jun. 27, 2016.

Popovic, M. et al., "Grasping Unknown Objects Using an Early Cognitive Vision System for General Scene Understanding;" 20111 IEEE/RSJ International Conference on Intelligent Robots and Systems (IROS); 9 pages; Sep. 25, 2011.

European Patent Office; Invitation to Pay Additional Fees; 10 pages; Sep. 18, 2020.

Alt, N. et al. Reconstruction of transparent objects in unstructured scenes with a depth camera. IEEE Int. Conf. on Image Processing, ICIP'13, Sep. 2013, Melbourne, Australia. 2013. <hal-00845456>; 6 pages.

Burger, W. et al. (1995). Immersive simulation for computer vision. na; 9 pages.

Konolige, K. (May 2010). Projected texture stereo. In 2010 IEEE International Conference on Robotics and Automation; IEEE; pp. 148-155.

Landau, M. J. et al. (2015). Simulating Kinect infrared and depth images. IEEE transactions on cybernetics, 46(12); pp. 3018-3031.

Lysenkov, I. et al. (2012). Recognition and pose estimation of rigid transparent objects with a kinect sensor. Robotics: Science and Systems, 273; 8 pages.

Planche, B. et al. (Oct. 2017). Depthsynth: Real-time realistic synthetic data generation from cad models for 2.5 d recognition. In 2017 International Conference on 3D Vision (3DV) IEEE; pp. 1-10.

Qi, C. et al. (2018). "Frustum PointNets for 3D Object Detection from RGB-D Data." In Proceedings of the IEEE Conference on Computer Vision and Pattern Recognition; pp. 918-927.

Skinner, J. et al. (Oct. 2016). High-fidelity simulation for evaluating robotic vision performance. In 2016 IEEE/RSJ International Conference on Intelligent Robots and Systems (IROS) IEEE; pp. 2737-2744.

Tallavajhula, A. (2018). Lidar Simulation for Robotic Application Development: Modeling and Evaluation (Doctoral dissertation); 112 pages.

Veitch-Michaelis, J. et al. (Jun. 2016). Enhancement of stereo imagery by artificial texture projection generated using a LIDAR. In ISPRS-International Archives of the Photogrammetry, Remote Sensing and Spatial Information Sciences (vol. 41, pp. 599-606). Copernicus Gesellschaft MBH.

European Patent Office; Intention to Grant issued in Application No. 20745340.8; 51 pages; dated Apr. 12, 2024.

* cited by examiner

ROBOTIC CONTROL BASED ON 3D BOUNDING SHAPE, FOR AN OBJECT, GENERATED USING EDGE-DEPTH VALUES FOR THE OBJECT

BACKGROUND

Vision data, from vision component(s) of a robot, can be processed to generate three-dimensional (3D) bounding box(es) for object(s) captured by the vision data. A 3D bounding box of an object provides a full multi-dimensional representation of the object, such as a seven-dimension (7D) or nine-dimension (9D) representation. For example, the 3D bounding box can provide a full 9D representation of the object that defines an approximation of the 3D location (three dimensions) and size (three dimensions) of the object, as well as the pose (three dimensions) of the object. 3D bounding boxes can be utilized for various aspects of control of the robot. For example, in manipulating an object, the robot can determine how to manipulate the object based on a generated 3D bounding box for the object. For instance, the 3D bounding box can be considered (exclusively or with other signal(s)) in determining how to grasp the object, push the object, and/or otherwise manipulate the object. As another example of control of a robot based on 3D bounding boxes, 3D bounding box(es) can be utilized to prevent collisions with objects, to navigate close to objects (without necessarily manipulating them), etc.

However, various 3D bounding box generation techniques can lack accuracy and/or lack robustness. Such lack of accuracy and/or robustness can result in failure of a robotic task being performed on the basis of the 3D bounding box. As one example, in many situations 3D bounding box generation techniques can generate poor 3D bounding boxes for objects that are fully or partially transparent. For instance, in generating a 3D bounding box for an object, a 3D point cloud that is determined to correspond to the object can be utilized. The 3D point cloud is generated based on vision data from one or more vision components. However, for a transparent object, the vision data can capture return signals from object(s) that are behind (relative to the vision component(s)) and/or below the transparent object. For instance, if the transparent object is resting on a table, the vision data can capture strong return signals from a portion, of the table, that is behind the transparent object. This can cause a portion of the 3D point cloud that is generated based on such vision data and that is determined to include 3D points that conform to the cup, to instead be dominated by 3D points that are behind the cup. As a result, the 3D bounding box can fail to accurately conform to the transparent object.

SUMMARY

Implementations disclosed herein relate to generating edge-depth values for an object, utilizing the edge-depth values in generating a 3D point cloud for the object, and utilizing the generated 3D point cloud for generating a 3D bounding shape (e.g., 3D bounding box and/or other 3D shape) for the object and/or for other purpose(s). Edge-depth values for an object are depth values that are determined from frame(s) of vision data (e.g., a left image and a right image) that captures the object, and that are determined to correspond to an edge of the object (an edge from the perspective of frame(s) of vision data). As will be understood from the description herein, the generated 3D point cloud for an object captures only part of a surface of the object (e.g., only some of that which is visible in the vision data on which the 3D point cloud is generated). However, in implementations that generate the 3D bounding shape, the 3D bounding shape is amodal. In other words, the 3D bounding shape is a representation of the entire surface of the object, including portions that are not visible in the vision data.

As described in detail herein, techniques that utilize edge-depth values for an object (exclusively, or in combination with other depth values for the object) in generating 3D bounding shapes can enable accurate 3D bounding shapes to be generated for partially or fully transparent objects. In contrast, other techniques lead to inaccurate 3D bounding shapes in many situations for partially or fully transparent objects. Moreover, techniques that utilize edge-depth values can improve the accuracy of 3D bounding shapes for even non-transparent objects. Such increased accuracy 3D bounding shapes directly improve performance of a robot that utilizes the 3D bounding shapes in performing various tasks.

As one example of generating and utilizing edge-depth values, assume a robot includes an infrared projector that projects an infrared pattern, and also includes a first infrared sensor and a second infrared sensor. A first infrared image can be captured by the first infrared sensor at a first time and a second infrared image can be captured by the second infrared sensor at or near (e.g., within 5 milliseconds of) the first time. For example, the first and second infrared sensors can be synchronized and the first and second infrared images captured at the same time based on the synchronization. An edge-depth image can be generated based on the first and second infrared images, where the edge-depth image includes edge-depth values for only detected edges in the first and second infrared images. For instance, local contrast normalization (and/or other techniques) can be performed on the first and second infrared images to determine edge pixels, of pixels of the respective images, that constitute edges. Only the edge pixels of the first and second infrared images can be processed to generate the edge-depth image. For example, block matching techniques can be performed, using the edge pixels, to generate the edge-depth image and/or machine-learning based techniques can be utilized to generate the edge-depth image. For instance, machine-learning based techniques can be utilized that process, using a machine learning model, the edge pixels from both images to generate a predicted edge-depth image.

In many implementations, by processing only edge pixels from the first and second infrared images, the edge-depth image can include accurate depth values for various pixels that, had all pixels from the first and second infrared images instead have been processed, would otherwise be inaccurate and/or null. For example, by processing only edge pixels from the first and second infrared images, edge-depth values for certain pixels of the edge-depth image (i.e., at least some of the pixels that correspond to edges) can be within 1 inch (or less) of a ground truth value. In contrast, had all pixels been processed (including non-edge-depth pixels), the certain pixels of a resulting depth image would be null and/or would more than 2 inches off (or greater) from a ground truth value.

A 3D point cloud can then be generated based at least in part on the edge-depth image. The 3D point cloud can be generated based on only the edge-depth image (and optionally other earlier in-time edge-depth images). For example, the 3D point cloud can be generated based on the X, Y, and depth values of pixels of the edge-depth image, and with reference to pose(s) of the vision sensor(s) and/or the robot.

Optionally, the 3D point cloud also includes 3D point(s) based on depth value(s) from a depth image generated based on the first and second infrared images, without utilizing edge-detection techniques (e.g., a depth image generated based on all pixels of the infrared images). To generate the 3D point cloud for the object, a red, green, blue (RGB) image can also be captured at or near the time of capturing the left and right infrared images. The RGB image can be processed, using an object detection model, to generate a two-dimensional (2D) bounding shape for the object. 3D point cloud values can then be determined that correspond to the 2D bounding shape (e.g., are within a frustum determined based on the 2D bounding shape for the object). In other words, 2D object detection is utilized to identify an area of the 2D image that encompasses the object in the 2D image, and that area is utilized to determine 3D point cloud values that correspond to that area. The 3D point cloud values that correspond to the 2D bounding shape can then optionally be processed, using a segmentation machine learning model, to mask out 3D point cloud values that do not correspond to the object, resulting in a segmented 3D point cloud for the object. In some implementations, after segmentation and if 3D points were included in the 3D point cloud that are in addition to edge-depth 3D points, one or more can optionally be removed for the 3D point cloud for the object. For example, any 3D points not within a certain depth range of the edge-depth 3D points can optionally be removed. The 3D point cloud for the object can then be processed using a 3D bounding shape prediction model, to generate a predicted 3D bounding shape.

Although the preceding example is described with respect to generating an edge-depth image utilizing a pair of infrared images, a pair of RGB images can alternatively be utilized in generating the edge-depth image. For example, the pair of RGB images can be from a pair of RGB cameras or from a single camera and captured at different perspectives and close in time (e.g., sequentially). Continuing with the example, edges can be detected in each of the RGB images using Canny edge detection techniques and/or other edge detection technique(s). Further, an edge-depth image can be generated based on only detected edges in the pair of RGB images using block matching and/or machine learning based techniques. A 3D point cloud can then be generated based at least in part on the edge-depth image. The 3D point cloud can be generated based on only the edge-depth image, or can optionally also include depth value(s) from a depth image generated based on the first and second RGB images, without edge detection techniques (e.g., a depth image generated based on all pixels of the RGB images). One of the RGB images can be processed, using an object detection model, to generate a 2D bounding shape for the object, and 3D point cloud values determined that correspond to the 2D bounding shape. The 3D point cloud values that correspond to the 2D bounding shape can then optionally be processed, using a segmentation machine learning model to mask out 3D point cloud values that do not correspond to the object, resulting in a segmented 3D point cloud for the object. If 3D points were included in the 3D point cloud that are in addition to edge-depth 3D points, one or more can optionally be removed for the 3D point cloud for the object. The 3D point cloud for the object can then be processed using a 3D bounding shape prediction model, to generate a predicted 3D bounding shape.

Implementations described herein additionally or alternatively relate to utilizing a simulator to generate training instances that include: 3D point clouds, for simulated objects, that include (or are restricted to) edge-depth 3D points; and corresponding ground truth 3D bounding shapes for the simulated objects. Those implementations further relate to training a 3D bounding shape prediction model based on the training instances.

In various implementations, the edge-depth based 3D points included in the 3D point cloud for a simulated object in a simulated environment (an "object 3D point cloud") can be included based on being determined to correspond to edges of the simulated object, as determined from a perspective of one or more simulated vision sensors. In some of those various implementations, a simulated infrared projection is projected in the simulated environment. The simulated infrared projection can be projected through (or at least weakly reflected by) those portion(s) of the simulated object that are modeled as transparent. First and second simulated infrared images are captured, from respective first and second points of view, and the edge-depth 3D points are determined based on the first and second simulated infrared images. For example, edge-pixels, of pixels of the first and second simulated infrared images, can be determined using local contrast normalization and/or other techniques, and a simulated edge-depth image generated that includes edge-depth values for only detected edges in the first and second simulated infrared images. Those edge-depth values can be utilized to determine edge-depth 3D points for a simulated 3D point cloud. For a training instance that includes an object 3D point cloud for an object and a ground truth bounding shape for the object, the object 3D point cloud can include those 3D points, of the simulated 3D point cloud, determined to correspond to the object. Determining the 3D points that correspond to the object can be based on ground truth data from the simulator (e.g., those points that are actually within a threshold distance of the object can be selected). Alternatively, the 3D points that correspond to the object can be determined using a 2D bounding box for the object determined based on a simulated RGB image, determining the 3D points that correspond to the 2D bounding box, and optionally segmenting the determined 3D points (using a segmentation model as described herein, or using ground truth simulated data).

In other of those various implementations, first and second simulated RGB images are captured from respective first and second points of view, and the edge-depth 3D points determined based on the first and second simulated RGB images. For example, edge-pixels, of pixels of the first and second simulated RGB images, can be determined using Canny edge detection and/or other techniques, and a simulated edge-depth image generated that includes edge-depth values for only detected edges in the first and second simulated RGB images. Those edge-depth values can be utilized to determine the edge-depth 3D points for a simulated 3D point cloud. An object 3D point cloud, for a given object of a training instance, can then be determined from the 3D point cloud (e.g., as described above).

In yet other of those various implementations, the edge-depth 3D points of the 3D point cloud can be determined based on ground truth 3D points, of the simulated object, that are determined to correspond to edges when viewed from the point of view of the simulated vision sensors. The ground truth 3D bounding shapes for the simulated objects can be determined based on ground truth data from the simulator, and can be tightly fitted based on the accuracy of the ground truth data.

Thus, a 3D bounding shape prediction model can be trained based on a large quantity of training instances generated by a simulator. The training instances can reflect various different environment and/or various different objects, which can be quickly and efficiently rendered in the simulator. Moreover, the accurate 3D bounding shapes that can be generated using the simulator enable the model to be trained and subsequently utilized in generating tight and accurate 3D bounding shapes in use. Further, implementations that utilize simulated image pairs (e.g., RGB image pairs or infrared image pairs) in generating the edge-depth 3D points can mitigate the reality gap as they mimic the process that can be utilized to generate the edge-depth 3D points when the 3D bounding shape prediction model is utilized in real robots. In other words, in using image pairs instead of ground truth 3D points in generating edge-depth 3D points, the training data can more accurately reflect the edge-depth 3D points generated using real robots, resulting in improved performance of the 3D bounding shape prediction model when used by the real robot. Thus, the object 3D point clouds of training instances can be generated to more accurately reflect real world 3D point clouds, while the 3D bounding shapes of the training instances can be tightly fitted using ground truth data from the simulator. As used herein, the "reality gap" is a difference that exists between real robots and/or real environments—and simulated robots and/or simulated environments simulated by a simulator.

As also described herein, the simulator can additionally or alternatively be utilized to generate training instances for training a segmentation model. The segmentation model is used to process a candidate object 3D point cloud (e.g., determined based on correspondence to a 2D bounding box for an object), and to generate a segmentation mask that is used to mask any 3D points that are included in the candidate object 3D point cloud, but do not correspond to the object. Ground truth simulator data can be used to generate the segmentation masks of training instances for training the segmentation model. Further, the object 3D point clouds can be generated utilizing one or more of the techniques described above with respect to the 3D bounding shape training instances. However, the object 3D point clouds for the segmentation model training instances will not be segmented, as the goal in training the segmentation model is to generate accurate masks for segmenting unsegmented object 3D point clouds.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described herein. Yet other implementations can include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 2A:
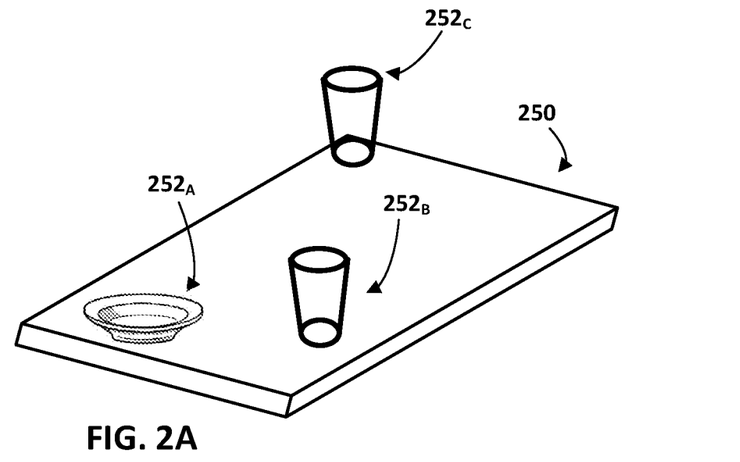
FIG. 2A illustrates an example of a real environment with objects resting on an opaque surface, including an opaque bowl and two transparent cups.
Figure 2B:
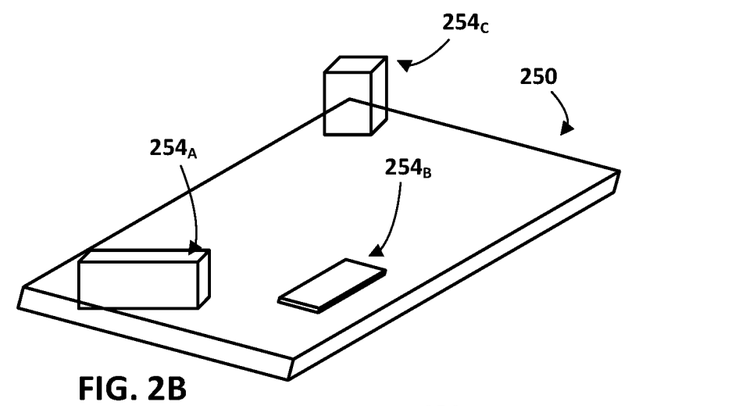
FIG. 2B illustrates an example of 3D bounding boxes that could be generated for the objects of FIG. 2A, utilizing prior 3D bounding box generation techniques.
Figure 2C:
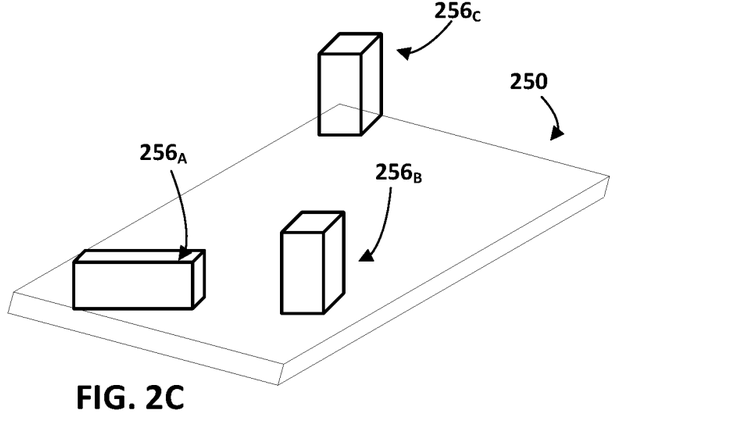
FIG. 2C illustrates an example of improved 3D bounding boxes that could be generated for the objects of FIG. 2A, utilizing 3D bounding box generation techniques described herein.

Turning initially to FIGS. 2A, 2B, and 2C, one example is illustrated of improvements that can be achieved according to various implementations disclosed herein. FIG. 2A illustrates an example of a real environment with objects $252_{A-C}$ resting on an opaque table 250. The objects $252_{A-C}$ include an opaque bowl $252_A$, a first transparent cup $252_B$, and a second transparent cup $252_C$.

FIG. 2B illustrates an example of 3D bounding boxes $254_{A-C}$ that could be generated for the objects $252_{A-C}$ of FIG. 2A, utilizing prior 3D bounding box generation techniques. As a working example for FIG. 2B, assume that in FIG. 2B the bounding boxes were generated based on a pair of infrared images, from infrared sensor(s) at points of view that generally correspond to the point of view of FIGS. 2A-2C. Further assume that an infrared projector projected an infrared pattern into the real environment of FIG. 2A and from the point of view of FIGS. 2A-2C, and that the infrared pattern is captured by the pair of infrared images.

As observable by comparison of FIGS. 2A and 2B, bounding box $254_A$ is a relatively accurate bounding box for opaque bowl $252_A$. This can be due to the opaque bowl $252_A$ being opaque. As a result of being opaque, the projected infrared pattern is reflected strongly by the surface of the opaque bowl $252_A$ and detected as a strong return signal by the infrared sensor(s). Thus, a 3D point cloud for opaque bowl $252_A$, generated based on the pair of infrared images, can actually reflect points that are on (or very close to) the surface of the opaque bowl $252_A$.

On the other hand, bounding box $254_B$ is not an accurate bounding box for first transparent cup $252_B$. It does not extend far enough up from the table 250 and also extends too far behind (from a perspective of the point of view of FIG. 2B) the first transparent cup $252_B$. This can be due to the first transparent cup $252_B$ being transparent and, as a result, the projected infrared pattern is actually largely projected through many transparent portions of the first transparent cup $252_B$ and reflected most strongly by the opaque surface of the table 250 that is near and behind the first transparent cup $252_B$. This can cause the return signal from the reflection of the table 250 to be stronger than any return signal from the first transparent cup $252_B$ for many portion(s) of the transparent cup $252_B$. Thus, the infrared sensor(s) mostly (or exclusively) detect the infrared pattern as it is reflected from the table 250, instead of from the first transparent cup $252_B$. In other words, the reflection of the infrared pattern from the table 250 dominates much (or all) of any reflection of the infrared pattern by the first transparent cup $252_B$. Thus, an object 3D point cloud for the first transparent cup $252_B$, generated based on the pair of infrared images, can actually reflect a majority of points that are on (or very close to) the table 250, instead of points on the first transparent cup $252_B$.

Bounding box $254_C$ is also not an accurate bounding box for second transparent cup $252_C$. It does not extend far enough up from the table 250. This can be due to the second transparent cup $252_C$ being transparent and, as a result, the projected infrared pattern is actually projected through many transparent portions of the first transparent cup $252_B$. However, it is noted that bounding box $254_C$ is more accurate than bounding box $254_B$. This can be due to, for example, the second transparent cup $252_C$ being on the edge of the table 250 and there not being any opaque objects close behind the second transparent cup $252_C$. As a result, the projected infrared pattern that passes through the cup is reflected by far away object(s) and the return signal from the reflection on the far away object(s) will be weak so that the limited reflection of the projection pattern by the second transparent cup $252_C$ will still dominate in the returning signal. Thus, an object 3D point cloud for the second transparent cup $252_C$ generated based on the pair of infrared images, can actually reflect at least some points that are on (or close to) the second transparent cup $252_C$. However, due to transparency of the second transparent cup $252_C$, 3D points may not be determined for various portions of the cup, which can cause the bounding box $254_C$ to be inaccurate (e.g., too short). Additionally or alternatively, the weak reflection from the far away objects may still register for some portions, leading to some 3D points being for the far away objects, which can also cause the bounding box $254_C$ to be inaccurate.

FIG. 2C illustrates an example of improved 3D bounding boxes $256_{A-C}$ that could be generated for the objects $252_{A-C}$ of FIG. 2A, utilizing 3D bounding box generation techniques described herein. As observable by comparison of FIGS. 2A, 2B, and 2C, bounding boxes $256_B$ and $256_C$ of FIG. 2C are much more accurate representations of transparent cups $252_B$ and $252_C$ than are bounding boxes $254_B$ and $254_C$ of FIG. 2B. Moreover, even bounding $256_A$ is a slightly more accurate (i.e., tighter) representation of opaque bowl $252_A$ than is bounding box $254_A$ of FIG. 2B. As described herein, this can be a result of simulator-based training techniques described herein and/or based on techniques described herein that utilize the edge-depth values in generating object 3D point clouds for the objects, and that utilize the generated object 3D point clouds for generating 3D bounding boxes $256_{A-C}$. Such increased accuracy 3D bounding boxes (or other shape(s)) directly improves performance of a robot that utilizes the 3D bounding boxes in performing various tasks. Turning now to the remainder of the figures, various implementations of such techniques are described in more detail.

Figure 1:
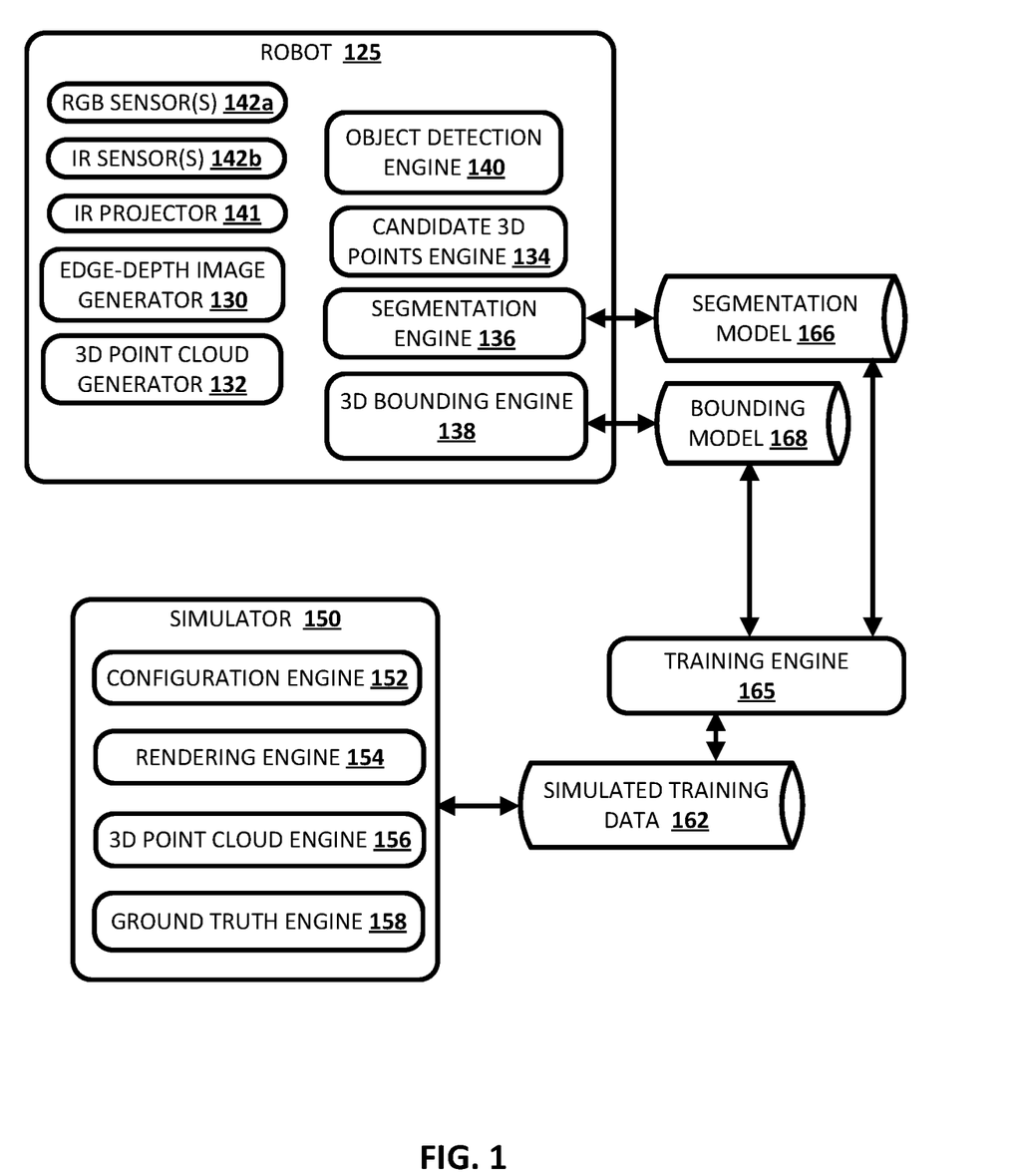
FIG. 1 illustrates an example environment in which implementations described herein can be implemented.

FIG. 1 illustrates an example environment in which implementations described herein can be implemented. FIG. 1 includes an example robot 125, a simulator 150, and a training engine 165. Also included are a segmentation model 166 and a bounding model 168, both of which can be utilized by the robot 125 and/or trained by the training engine 165. Also included is simulated training data 162, that is generated based on data from the simulator 150, and utilized by the training engine 165 in training the bounding model 168 and/or the segmentation model 166.

Robot 125 includes edge-depth image generator 130, 3D point cloud generator 132, object detection engine 140, candidate 3D points engine 134, segmentation engine 136, and 3D bounding engine 138. It is noted that robot 125 will include additional engine(s) such as a planning engine, a control engine, and/or other engine(s) described below with respect to robot 725. For example, the planning engine can determine which commands to provide to actuator(s) to effectuate a desired trajectory based on 3D bounding boxes, a current robot state, and/or various other considerations. Also, for example, the control engine can provide those commands to actuator(s) to effectuate the desired trajectory and may also be responsible for real time adjustments based on real-time events. However, such additional engine(s) are not illustrated in FIG. 1 for simplicity.

Robot 125 also includes various sensors such as vision sensors, force-torque sensors, vision sensors, etc. Only some example vision sensors are illustrated in FIG. 1 for simplicity, and include RGB sensor(s) 142a and infrared sensor(s) 142b. An infrared projector 141 is also included that projects an infrared pattern onto environmental objects. The projected infrared pattern can be detected by infrared sensor(s) 142b. In some implementations, two infrared sensors 142b can be provided that are positionally offset, and that capture infrared images at/near the same time. Alternatively, a single infrared sensor 142b can be provided and pairs of infrared images, from the single infrared sensor 142b, that are from different points of view but captured near in time, can be used in generating edge-depth images. Moreover, as described herein, in some implementations pairs of RGB images, from one or multiple RGB camera(s) 142a, can additionally or alternatively be used in generating edge-depth images. In some of those implementations, infrared sensor(s) 142b and infrared projector 141 can be omitted.

First and second infrared images, captured at/near the same time and from different points of view (e.g., one from each of two infrared sensors 142b), can be processed by edge-depth image generator 130 to generate an edge-depth image. The edge-depth image includes edge-depth values for only detected edges in the first and second infrared images. For example, the edge-depth image generator 130 can process the first and second infrared images, utilizing local contrast normalization (and/or other techniques), to determine edge pixels, of the first and second infrared images, that constitute edges. The edge-depth image generator 130 can then process only the edge pixels of the first and second infrared images to generate the edge-depth image. For example, the edge-depth image generator 130 can utilize block matching techniques and/or machine-learning based techniques to generate the edge-depth image.

3D point cloud generator 132 can generate a 3D point cloud based on the edge-depth image generated by edge-depth generator 130. For example, the 3D point cloud generator 132 can generate the 3D point cloud based on only edge-depth image(s). For example, the 3D point cloud can be generated by the 3D point cloud generator 132 based on the X, Y, and depth values of pixels of the edge-depth image. Optionally, the 3D point cloud generator 132 also includes, in the 3D point cloud, 3D point(s) that are based on depth value(s) from a depth image generated based on the first and second infrared images, without edge detection techniques.

The object detection engine 140 can process an RGB image, captured at/near the same time as the infrared images, to detect and optionally classify objects in the RGB image. For example, the object detection engine 140 can utilize one or more machine learning models to detect 2D bounding boxes (or other bounding shape) for each of one or more objects in the RGB image. For instance, Faster R-CNN models and/or other models can be utilized.

The candidate 3D points engine 134 determines, for each one or more objects detected by object detection engine 140, candidate 3D points that correspond to the object. In other words, for each object detected by object detection engine 140 it selects, from the 3D point cloud generated by 3D point cloud generator 132, 3D points that correspond to the object. For example, in selecting 3D points for a given object, candidate 3D points engine 134 can identify the 3D points that correspond to the 2D bounding shape detected by object detection engine 140. For instance, the candidate 3D points engine 134 can identify those points that are within a frustum determined based on the 2D bounding shape.

The segmentation engine 136 utilizes the segmentation model 166 to process the candidate 3D points for an object, determined by candidate 3D points engine 134, to generate a mask. The segmentation model 166 is trained to generate masks that, when applied to a 3D point cloud, mask out any 3D points that do not belong to a primary object of the 3D point cloud. The generated mask is applied to the 3D points from the candidate 3D points engine 134, to mask out 3D points (if any) that do not correspond to the object, thereby generating segmented 3D points for the object. In some implementations, after segmentation and if 3D points were included in the 3D point cloud that are in addition to edge-depth 3D points, the segmentation engine 136 can optionally remove one or more from the segmented 3D point cloud for the object. For example, any 3D points not within a certain depth range of the edge-depth 3D points can optionally be removed. In some of those implementations, the removal can be performed only for objects having a class (optionally determined by object detection engine 140) that indicates transparency or potential transparency. In some implementations, segmentation engine 136 can be omitted and the 3D bounding engine 138 can directly process the candidate 3D points for an object, determined by candidate 3D points engine 134. In some of those implementations, the bounding model 168 utilized by the 3D bounding engine 138 can be trained based on 3D point clouds for objects, where the 3D point clouds have not been segmented.

The 3D bounding engine 138 then processes the segmented 3D point cloud for the object, using a 3D bounding shape prediction model 168 (also referenced as "bounding model 168"), to generate a predicted 3D bounding shape (e.g., bounding box) for the object. In some implementations, the 3D bounding model 168 is trained to output parameters of the 3D bounding shape, such as size, location, and orientation parameters.

The generated 3D bounding shape can then be utilized by the robot 125 for one or more aspects of robotic control. For example, a planning engine of the robot 125 can utilize the 3D bounding shape to determine a pose, for an end effector of the robot, for manipulating the object. For instance, a grasp pose, for grasping the object, can be determined based on the 3D bounding shape. Actuators of the robot can then be controlled to cause a grasping end effector to maneuver to the grasp pose, then attempt a grasp of the object. As another example, the 3D bounding shape can be utilized by a path planner of the robot to determine a trajectory (of the robot 125 as a whole, or of an end effector) that does not collide with the object. Actuators of the robot can then be controlled to cause traversal of the determined trajectory.

The simulator 150 of FIG. 1 is implemented by one or more computer systems and is used to simulate an environment that includes corresponding environmental object(s), and to simulate one or more vision components such as RGB sensor(s), infrared sensor(s), and/or other vision component(s). Various simulators can be utilized, such as the BULLET physics engine and/or other simulator.

In some implementations, the simulator 150 is utilized to generate training instances, of simulated training data 162, that are used to train the bounding model 168. Each of those training instances can include, for example: a corresponding 3D point cloud for a corresponding simulated object, that includes (or is restricted to) edge-depth 3D points; and corresponding ground truth 3D bounding shapes for the corresponding simulated object.

In some implementations, the simulator 150 is additionally or alternatively utilized to generate training instances, of simulated training data 162, that are used to train the segmentation model 168. Each of those training instances can include, for example: a corresponding 3D point cloud determined to correspond to a 2D bounding shape of an object, and that include (or are restricted to) edge-depth 3D points; and a corresponding ground truth segmentation mask for the corresponding 3D point cloud.

The simulator 150 includes a configuration engine 152. The configuration engine 152 can be utilized to adapt a simulated environment, of the simulator 120, to enable various objects and various environmental conditions to be represented in training instance input of simulated training instances of simulated training data 162. For example, the environmental data can define: environmental objects; states of the environmental objects (e.g., poses); color(s) of the environmental object(s); whether all or portions of the environmental objects are transparent, semi-transparent, or opaque; lighting conditions, etc. In a given configuration, multiple training instances can be generated, each being from a different point of view of simulated vision component(s). The configuration engine 152 further varies the configurations during generating of simulated training data 162 to provide variance in object(s), lighting conditions, etc.

The rendering engine 154 renders simulated vision frame(s) for simulated vision component(s) of the simulator. For example, the rendering engine 154 can render simulated RGB images for a simulated RGB sensor. Also, for example, the rendering engine 154 can render simulated infrared images for simulated infrared sensor(s). When simulated infrared images are rendered, the rendering engine 154 (or a separate engine) can further project a simulated infrared projection in the simulated environment. The simulated infrared projection can be projected through (or at least weakly reflected by) those portion(s), of any simulated object, that are modeled as transparent. The rendered simulated infrared images can capture the simulated infrared projection, from a point of view of the simulated infrared sensor(s), and with strengths that are dictated by the simulated infrared projection in the simulated environment (e.g., based on transparency and/or reflectivity of object(s) in the environment).

The 3D point cloud engine 156 generates 3D point clouds, and selects training instance 3D point clouds, from the 3D point clouds, for use as training instance input in training instances. For example, for training instances used to train the bounding model 168, the 3D point cloud engine 156 can generate training instance 3D point clouds that are segmented 3D point clouds of an object, and that include (or are restricted to) edge-depth 3D points. Also, for example, for training instances used to train the segmentation model 166, the 3D point cloud engine 156 can generate training instance 3D point clouds that are determined to correspond to a 2D bounding shape of an object, and that include (or are restricted to) edge-depth 3D points. It is noted that the 3D point clouds for objects used in training instances for the bounding model 168 and those used in separate training instances for the segmentation model, each include 3D point clouds for a corresponding object. However, in various implementations the 3D point clouds for objects that are used in training instances for the bounding model 168 are segmented using ground truth data from the simulator or using an already trained version of the segmentation model 166. For example, the 3D point clouds for the objects can be candidate 3D point clouds for the object, selected based on correspondence to a 2D bounding box for the object, with 3D points segmented therefrom based on the segmented 3D points being determined to not correspond to the object. In contrast, the 3D point clouds for objects that are used in training the segmentation model 166 will not be segmented, as the segmentation model 166 is being trained for use in performing segmentation.

In some implementations, in generating a 3D point cloud for a training instance, 3D point cloud engine 156 uses first and second simulated infrared images, from rendering engine 154, that are captured from respective first and second points of view. The 3D point cloud engine 156 then determines edge-depth 3D points based on the first and second simulated infrared images. For example, the 3D point cloud engine 156 can determine edge-pixels, of pixels of the first and second simulated infrared images, using local contrast normalization and/or other techniques. Further, the 3D point cloud engine 156 can generate a simulated edge-depth image that includes edge-depth values for only detected edges in the first and second simulated infrared images. Optionally, the 3D point cloud engine 156 can also include non-edge 3D points in the 3D point cloud. For example, the 3D point cloud engine 156 can generate an additional simulated depth image based on all pixels of the first and second simulated infrared images, and use depth values from that image in generating the 3D point cloud.

When the training instance is for training the bounding model 168, the 3D point cloud engine 156 can then determine training instance 3D point clouds, of the 3D point cloud, that correspond to a given object—and include only those in the training instance. In some implementations, the 3D point cloud engine 156 can utilize ground truth data to determine which of the 3D points are within a threshold distance of a surface of the given object, and use those as the training instance 3D point clouds. In some other implementations, the 3D point cloud engine 156 can utilize an object detection model to detect a 2D bounding shape for an object in a simulated RGB image, and determine 3D points of the 3D point cloud that correspond to that 2D bounding shape. Those determined 3D points (optionally after segmentation using a segmentation engine or ground truth data) can be used as the training instance 3D point clouds of the training instance.

When the training instance is for training the segmentation model 168, the 3D point cloud engine 156 can then determine training instance 3D point clouds, of the 3D point cloud, that correspond to a 2D bounding box for a given object, detected using an object detection model and a simulated RGB image—and include those in the training instance. For example, the 3D point cloud engine 156 can utilize an object detection model to detect a 2D bounding shape for an object in an simulated RGB image, and determine 3D points of the 3D point cloud that correspond to that 2D bounding shape. Those determined 3D points (without any segmentation) can be used as the training instance 3D point clouds of the training instance.

In some implementations, instead of simulated infrared images, the 3D point cloud engine 156 can instead utilize simulated RGB images in determining edge-depth values (and optionally non-edge-depth values) for generating 3D point clouds. The 3D point cloud engine 156 can then determine training instance 3D point clouds, of the RGB image based 3D point cloud, that correspond to a given object—and include only those in the training instance.

In some implementations, the 3D point cloud engine 156 can additionally or alternatively determine training instance 3D point clouds for a training instance, for training bounding model 168, based on ground truth 3D points of a simulated object. For example, the 3D point cloud engine 156 can determine those portions of a simulated object that correspond to edges, when viewed form the point of view of simulated vision sensor(s), and generate edge 3D points based on ground truth values for those portions.

The ground truth engine 158 determines ground truth data for the training instances. For example, for training instances used to train the bounding model 168, the ground truth engine 158 can generate ground truth data of 3D bounding shape parameters that describe ground truth 3D bounding shapes for the corresponding object of the training instance. Also, for example, for training instances used to train the segmentation model 166, the ground truth engine 158 can generate ground truth data of respective masks that each mask out any 3D points, of corresponding training instance input, that do not correspond to the corresponding target object.

The ground truth engine 158, for a given training instance used to train the bounding model 168, can determine ground truth 3D bounding shapes that are tightly fitted based on the accuracy of the ground truth data. The ground truth data for the given training instance can be a representation of the ground truth 3D bounding shape, such as a size, location, and orientation when the 3D bounding shape is a bounding box.

The training engine 165 utilizes the simulated training data 162 to train the bounding model 168 and/or the segmentation model 166. For example, the training engine 165 can train the bounding model 168 based on a large quantity of training instances generated by the simulator 150. Each of the training instances can include: training instance input of a respective 3D point cloud for a simulated object, where the 3D point cloud includes (or is restricted to) edge-depth 3D points; and training instance output that represents a ground truth 3D bounding box or other 3D bounding shape for the simulated object. The training instances can reflect various different environment and/or various different objects, which can be quickly and efficiently rendered in the simulator 150. Moreover, the accurate 3D bounding shapes that can be generated using the simulator 150 enable the bounding model 168 to be trained to be utilized in generating tight and accurate 3D bounding shapes in use. Further, the reality gap can be mitigated at least in implementations where 3D point cloud engine 156 utilizes simulated image pairs (e.g., RGB image pairs or infrared image pairs) in generating the edge-depth 3D. This can be due to those implementations mimicking the process that can be utilized to generate the edge-depth 3D points when the bounding model 168 is utilized by robot 125 (or other real robot).

Figure 3:
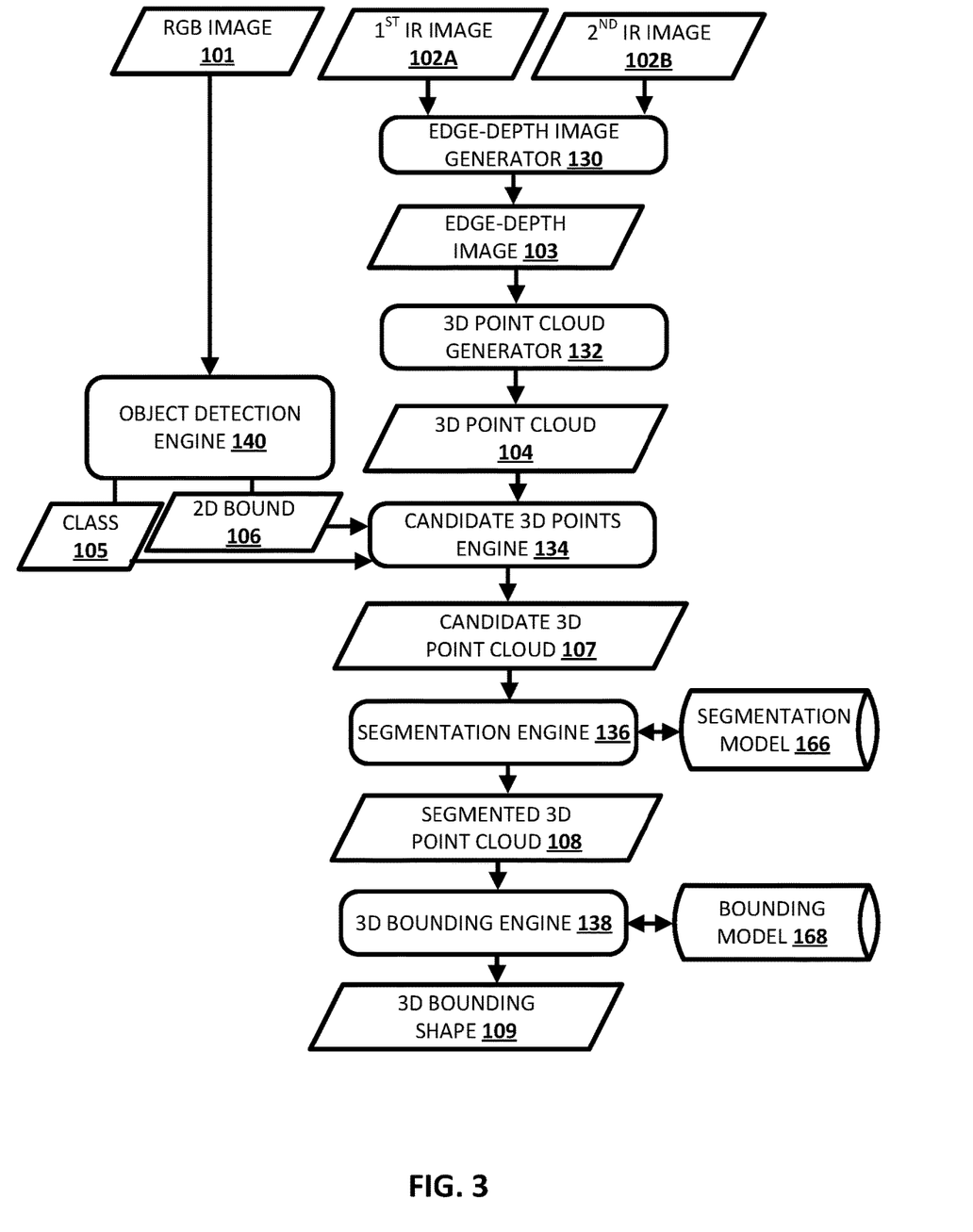
FIG. 3 provides an example of how components, of the example environment of FIG. 1, can interact in various implementations.

Turning now to FIG. 3, an example is illustrated of how various components, of the robot 125 of FIG. 1, can interact in various implementations.

A first infrared image 102A and a second infrared image 102B are processed by edge-depth image generator 130 to generate an edge-depth image 103. The infrared images 102A and 102B are captured at/near the same time, by the infrared sensor(s) 142b (FIG. 1) and from different points of view. The edge-depth image 103 includes edge-depth values for only detected edges in the first and second infrared images 102A and 102B. For instance, edge-depth generator 130 can determine edge pixels, of pixels of the respective images, that constitute edges, and process only those pixels in generating the edge-depth image 103.

3D point cloud generator 132 generate a 3D point cloud 104 based on the edge-depth image generated by edge-depth generator 130. The 3D point cloud generator 132 can generate the 3D point cloud 104 based on only edge-depth image(s), or can optionally also include 3D point(s) that are based on depth value(s) from a depth image generated based on the first and second infrared images, without edge detection techniques.

An RGB image 101 is processed by the object detection engine 140 to generate 2D bounding boxes for object(s) captured in the RGB image 101, including a 2D bounding box 106 for an object captured by the RGB image 101. The RGB image 101 can be captured by one of the RGB sensor(s) 142A at/near the time of the capture of the infrared images 102A and 102B. Optionally, in some implementations, the object detection engine 140 can also detect a classification 105 for the object of the 2D bounding box.

The candidate 3D points engine 134 utilizes the 2D bounding box 106 to select, from the 3D point cloud 104, 3D points that correspond to the object of the 2D bounding box 106. Those 3D points are output as candidate 3D point cloud 107 for the object. As one example, the candidate 3D points engine 134 can identify those 3D points that are within a frustum determined based on the 2D bounding shape, and output those as candidate 3D point cloud 107 for the object.

Where the classification 105 is generated by the object detection engine 140, the candidate 3D points engine 134 can optionally use only edge-depth image 103 based 3D points when that classification 105 indicates the given object is "transparent" (e.g., a "transparent" class) or "possibly transparent" (e.g., a "cup" class, a "vase" class, etc.). In other words, the candidate 3D points engine 134 can optionally select only edge 3D points, for the candidate 3D point cloud 107, when the classification indicates at least potential transparency, and select additional 3D points when the classification does not indicate transparency.

The segmentation engine 136 processes the candidate 3D point cloud 107, using the segmentation model 166, to generate a mask. The segmentation engine 136 uses the generated mask to mask out any 3D points, from the candidate 3D point cloud 107, that do not belong to a primary object of the 3D point cloud, and thereby generates segmented 3D point cloud 108.

The 3D bounding engine 138 then processes the segmented 3D point cloud 108 for the object, using a 3D bounding model 168, to generate a predicted 3D bounding shape 109 (e.g., bounding box) for the object. In some implementations, the 3D bounding model 168 is trained to output parameters of the 3D bounding shape, such as size, location, and orientation parameters. The 3D bounding shape can then be utilized by the robot 125 (FIG. 1) for one or more aspects of robotic control.

Figure 4:
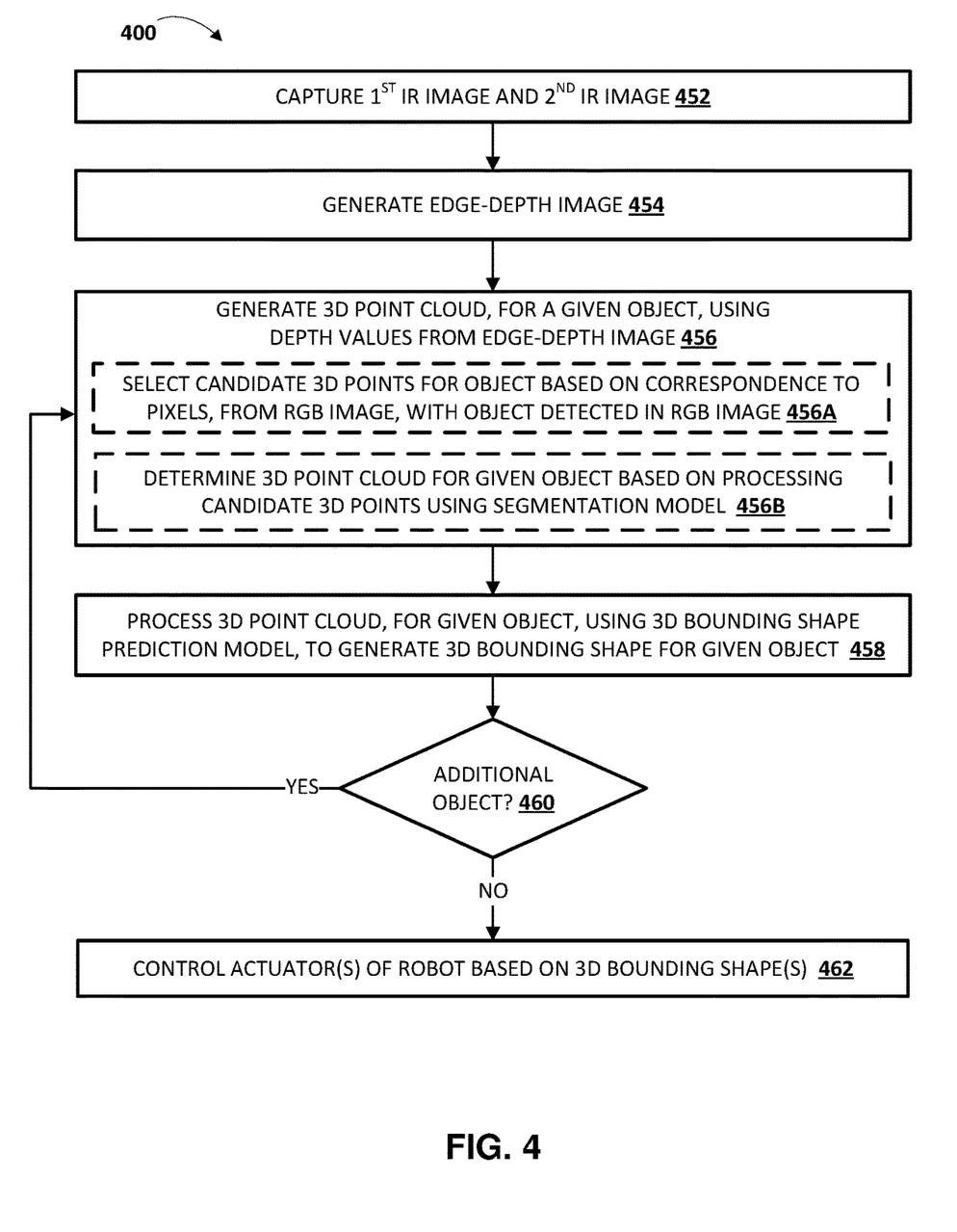
FIG. 4 is a flowchart illustrating an example method of generating 3D bounding shape(s) and controlling a robot based on the 3D bounding shape(s).

FIG. 4 is a flowchart illustrating an example method 400 of generating 3D bounding shape(s) and controlling a robot based on the 3D bounding shape(s). For convenience, some of the operations of the method 400 are described with reference to a system that performs the operations. This system may include various components of a robot, such as one or more components depicted in FIG. 1 and/or FIG. 7. Moreover, while operations of the method 400 are shown in a particular order, this is not meant to be limiting. One or more operations may be reordered, omitted or added.

At block 452, the system captures, from different points of view, a first infrared image and a second infrared image.

At block 454, the system generates an edge-depth image using the first and second infrared images of block 452. The edge-depth image includes edge-depth values for only detected edges in the first and second infrared images.

At block 456, the system generates a 3D point cloud, for a given object, using depth values from the edge-depth image. Block 456 can optionally include sub-blocks 456A and 456B. At sub-block 456A, the system selects candidate 3D points, from a plurality of 3D points generated based on the edge-depth image. The system selects the candidate 3D points based on their correspondence to pixels, from an RGB image, with an object detected in the RGB image. For example, a 2D bounding box for the object in the RGB image can be detected, and candidate 3D points selected based on corresponding to pixels of the RGB image that are within the 2D bounding box (e.g., within a frustum from those pixels). At sub-block 456B, the system determines a 3D point cloud for the given object further based on processing the candidate 3D points (of block 456A), using a segmentation model.

At block 458, the system processes the 3D point cloud, for the given object, using a 3D bounding shape prediction model, to generate a bounding shape for the given object.

At block 460, the system determines whether there is an additional object for which to generate a 3D bounding shape. For example, the system can determine whether additional object(s) were detected in the RGB image (block 456A) and for which a 3D bounding shape has not yet been generated. If so, the system can perform another iteration of block 456 and block 458 for the additional object. It is noted that in some implementations 3D bounding shapes can be generated for multiple objects in parallel. If, at block 460, the system determines there are not additional objects for which to generate a 3D bounding shape, the system proceeds to block 462.

At block 462, the system controls one or more actuators of a robot based on the 3D bounding shape(s) generated in one or more iterations of block 458. It is noted that method 400 can be continuously performed when a corresponding robot is in operation, utilizing newly captured images at each iteration, updating and/or generating bounding box predictions for various objects, and controlling the robot accordingly.

Figure 5:
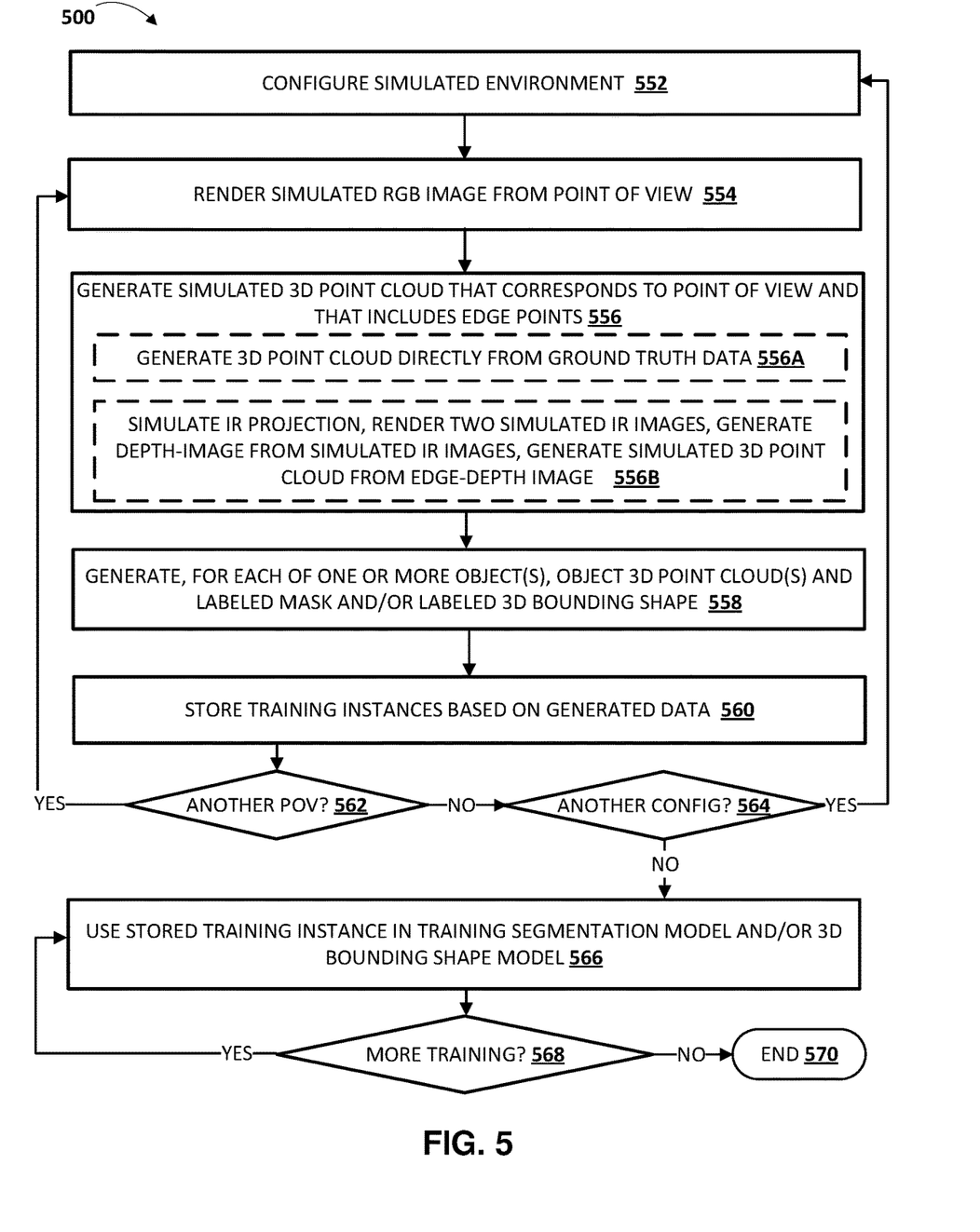
FIG. 5 is a flowchart illustrating an example method of using a simulator in generating training instances, and using the training instances in training a segmentation model and/or a 3D bounding shape model.

FIG. 5 is a flowchart illustrating an example method 500 of using a simulator in generating training instances, and using the training instances in training a segmentation model and/or a 3D bounding shape model. For convenience, some of the operations of the method 500 are described with reference to a system that performs the operations. This system may include various components of various computer systems, such as one or more components of the simulator 150 and/or training engine 165 depicted in FIG. 1. Moreover, while operations of the method 500 are shown in a particular order, this is not meant to be limiting. One or more operations may be reordered, omitted or added.

At block 552, the system configures a simulated environment. For example, the system can configure the simulated environment to include certain objects at certain poses, certain lighting conditions, etc.

At block 554, the system renders a simulated RGB image from a point of view.

At block 556, the system generates a simulated 3D point cloud that corresponds to the point of view and that includes edge points (as viewed from the point of view). Block 556 can optionally include sub-block 556A or sub-block 556B.

At sub-block 556A, the system generates the 3D point cloud directly from ground truth data of the simulator.

At sub-block 556B, the system instead simulates an infrared projection, renders two simulated infrared images, generates an edge-depth image from the simulated infrared images, and generates a simulated 3D point cloud from the edge-depth image (e.g., using pixels, from the simulated infrared images, determined to correspond to edges). In some implementations, the system optionally also generates a regular depth image from the simulated infrared images, and also includes 3D points from the regular depth image in the simulated 3D point cloud. Although not illustrated in FIG. 5 for simplicity, in some implementations an alternative sub-block of 556 can be provided in which a pair of simulated RGB images is utilized, instead of a pair of simulated infrared images, to generate the edge-depth image.

At block 558, the system generates, for each of one or more objects (captured in the infrared images and the RGB image): (1) object 3D point cloud(s) for the object and (2) a labeled mask and/or a labeled 3D bounding shape. For example, an object 3D point cloud and labeled 3D bounding shape pair can be generated, where the object 3D point cloud is one that has been segmented to include only 3D point(s) determined (by the segmenting) to correspond to a corresponding object. For instance, the object 3D point cloud for the object can be determined based on 3D points that correspond to a 2D bounding box for the object (determined from RGB image of block 554), and that are optionally segmented. Also, for example, an object 3D point cloud and labeled mask pair can be generated, where the object 3D point cloud is one that has been determined to correspond to an object (e.g., based on 2D bounding box from RGB image of block 554), but not yet segmented.

At block 560, the system stores training instances based on the generated data of block 558. For example, at block 560 training instances for training a bounding model can be generated. Each of those training instances can include, for a corresponding one of the objects: an object 3D point cloud that includes (or is restricted to) edge-depth 3D points for only the object (optionally segmented according to techniques described herein); and a corresponding ground truth 3D bounding shape. Also, for example, at block 558 training instances for training a segmentation model can additionally or alternatively be generated. Each of those training instance can include, for a corresponding one of the objects: an object 3D point cloud, determined to correspond to a 2D bounding shape of the object (but not yet segmented), and that include (or are restricted to) edge-depth 3D points; and a corresponding ground truth segmentation mask for the object 3D point cloud.

At block 562, the system determines whether to generate additional training instances from a different point of view and for the same configuration. If so, the system proceeds back to block 554 and renders another simulated RGB image from an additional point of view, generates an additional simulated 3D point cloud at block 556 from the additional point of view, then proceeds to blocks 558, and 560 to generate additional data and store additional training instances, based on the additional simulated 3D point cloud. If not, the system proceeds to block 564.

At block 564, the system determines whether to generate another configuration. If so, the system proceeds back to block 552 and generates a new configuration (e.g., new objects, new poses, etc.) for the simulated environment, then proceeds to additional iterations of blocks 554, 556, etc. If not, the system proceeds to block 566.

At block 566, the system uses a stored training instance in training a segmentation model and/or a 3D bounding shape model.

At block 568, the system determines whether to continue training the model(s). If, at an iteration of block 568, the system determines to continue training the model(s), then the system returns to block 566 and accesses an additional training instance. The system can determine whether to continue training the model(s) based on whether one or more conditions have been satisfied. The one or more conditions can include a threshold quantity of iterations, convergence of the model(s), and/or other condition(s).

If, at an iteration of block 568, the system determines not to continue training the model(s), then the system proceeds to block 570 and the method 500 ends.

Figure 6:
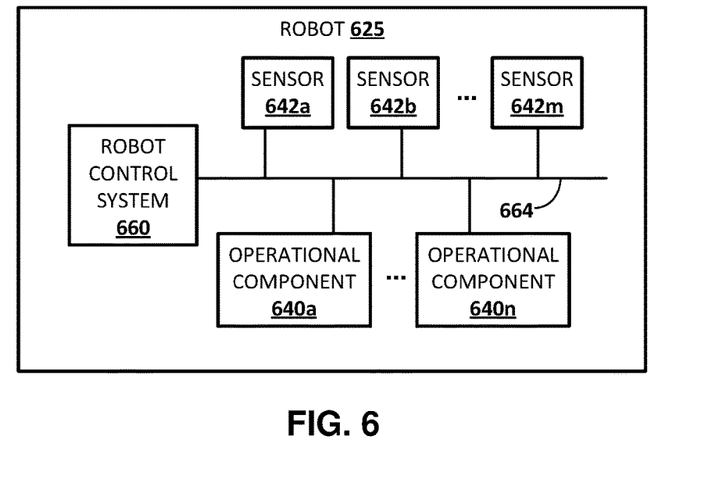
FIG. 6 schematically depicts an example architecture of a robot.

FIG. 6 schematically depicts an example architecture of a robot 625. The robot 625 includes a robot control system 660, one or more operational components 640a-640n, and one or more sensors 642a-642m. The sensors 642a-642m may include, for example, vision components, light sensors, pressure sensors, pressure wave sensors (e.g., microphones), proximity sensors, accelerometers, gyroscopes, thermometers, barometers, and so forth. While sensors 642a-642m are depicted as being integral with robot 625, this is not meant to be limiting. In some implementations, sensors 642a-642m may be located external to robot 625, e.g., as standalone units.

Operational components 640a-640n may include, for example, one or more end effectors and/or one or more servo motors or other actuators to effectuate movement of one or more components of the robot. For example, the robot 625 may have multiple degrees of freedom and each of the actuators may control actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 640a-640n, with each of the real time bursts comprising a set of one or more control commands that dictate, inter alio, the parameters of motion (if any) for each of one or more of the operational components 640a-640n. In some implementations, the robot control system 660 may perform one or more aspects of one or more methods described herein.

As described herein, in some implementations all or aspects of the control commands generated by control system 660 can be generated based on 3D bounding shapes generated according to techniques described herein.

Although control system 660 is illustrated in FIG. 6 as an integral part of the robot 625, in some implementations, all or aspects of the control system 660 may be implemented in a component that is separate from, but in communication with, robot 625. For example, all or aspects of control system 660 may be implemented on one or more computing devices that are in wired and/or wireless communication with the robot 625, such as computing device 710.

Figure 7:
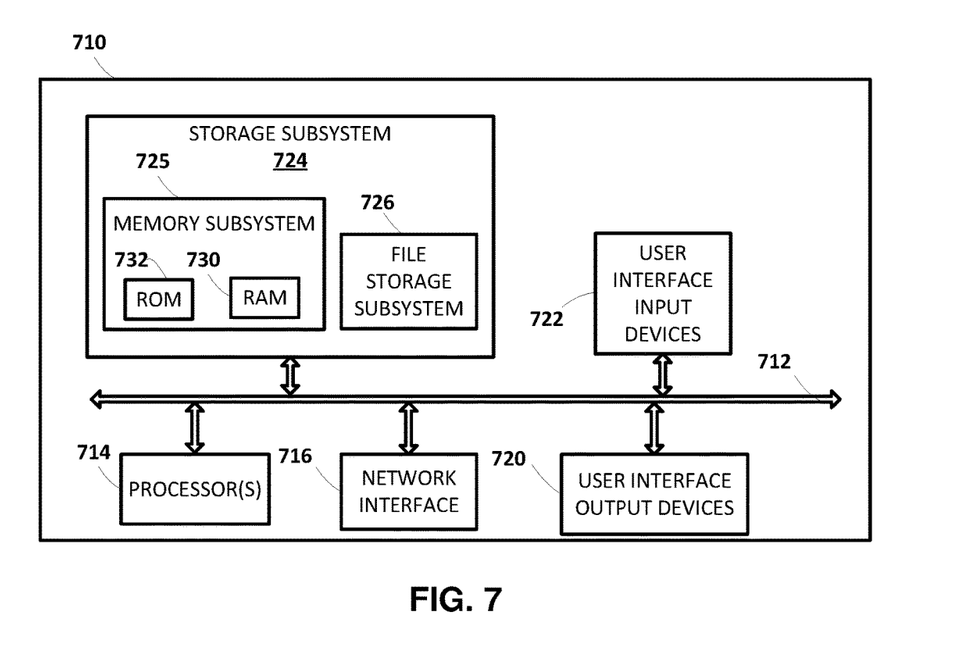
FIG. 7 schematically depicts an example architecture of a computer system.

FIG. 7 is a block diagram of an example computing device 710 that may optionally be utilized to perform one or more aspects of techniques described herein. For example, in some implementations computing device 710 may be utilized to execute simulator 150 and/or training engine 165. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors of a robot is provided and includes capturing a first infrared image and capturing a second infrared image. The first infrared image captures, from a first point of view, an infrared projection projected onto one or more objects in an environment of the robot. The infrared projection is projected by an infrared projector of the robot. The method further includes capturing a second infrared image that captures, from a second point of view, the infrared projection projected onto the one or more objects. The method further includes generating an edge-depth image that includes first corresponding edge-depth values for only detected edges in the first infrared image and the second infrared image. The method further includes generating a 3D point cloud for a given object of the one or more objects. Generating the 3D point cloud is based on the corresponding edge-depth values determined to correspond to the given object. The method further includes generating a 3D bounding shape for the given object. Generating the 3D bounding shape includes processing the 3D point cloud using a 3D bounding shape prediction model. The method further includes controlling one or more actuators of the robot based on the 3D bounding shape.

These and other implementations of the technology disclosed herein can include one or more of the following features.

In some implementations, the method further includes capturing a color image (e.g., a red, green, blue (RGB) image) that captures the one or more objects. In some versions of those implementations, the method further includes processing the color image using an object detection model to generate a two-dimensional (2D) bounding shape. In those versions, generating the 3D point cloud for the given object includes: determining the edge-depth values that correspond to the given object based on the edge-depth values being within a frustum generated based on RGB pixels, of the RGB image, that are within the 2D bounding shape. In some of those versions, generating the 3D point cloud for the given object further includes generating candidate 3D points for the 3D point cloud based on the candidate 3D points having corresponding depth values within the frustum. The candidate 3D points include edge-depth 3D points generated based on the first corresponding edge-depth values and the second corresponding edge-depth values, and generating the 3D point cloud for the given object is based on processing the candidate 3D points using an object segmentation model.

In some implementations, the method further includes generating a regular depth image that includes corresponding regular depth values. The regular depth values include depth values that are in addition to the edge-depth values, and generating the 3D point cloud is further based on the regular depth values determined to correspond to the given object. In some of those implementations, the given object includes at least one transparent surface, and a majority of the regular depth values fail to define any depth values that correspond to the at least one transparent surface.

In some implementations, generating the edge-depth image includes: performing local contrast normalization on the first infrared image to determine first edge pixels, of the first infrared image, that constitute edges; performing local contrast normalization on the first infrared image to determine second edge pixels, of the second infrared image, that constitute edges; and processing only the first edge pixels and the second edge pixels to generate the edge-depth image.

In some implementations, the first infrared image is captured by a first infrared sensor of the robot and the second infrared image is captured by a second infrared sensor of the robot.

In some implementations, the first infrared image is captured by an infrared sensor of the robot at the first point of view at a first time, and the second infrared image is captured by the infrared sensor of the robot at the second point of view at a second time.

In some implementations, controlling the one or more actuators of the robot based on the 3D bounding shape includes controlling the one or more actuators, based on the 3D bounding shape, to manipulate the given object.

In some implementations, the given object has at least one transparent surface.

In some implementations, the method further includes capturing a color image that captures the one or more objects, and processing the color image using an object classification model to generate a predicted classification of the given object. In some of those implementations, generating the 3D point cloud for the given object is further based on the predicted classification.

In some implementations, the generated 3D bounding shape defines a size of the object, a 3D location of the object, and optionally an orientation of the object. For example, the generated 3D bounding shape can be a 3D bounding box that defines an approximation of the 3D location (three dimensions) and size (three dimensions) of the object, as well as the pose/orientation (three dimensions) of the object.

In some implementations, a method implemented by one or more processors is provided and includes generating, based on simulated data from a simulator simulating a simulated environment that includes a given simulated object, a three-dimensional (3D) point cloud for the simulated object. Generating the 3D point cloud includes including, in the 3D point cloud, edge points determined to correspond to edges of the one or more simulated objects, as determined from a perspective of one or more simulated depth sensors. The method further includes generating ground truth 3D bounding shape parameters based on the simulated data. The ground truth 3D bounding shape parameters define a size, location, and orientation of a 3D bounding shape that encompasses the given simulated object. The method further includes generating predicted 3D bounding shape parameters for the given object. Generating the predicted 3D bounding shape parameters includes processing the 3D point cloud using a three-dimensional (3D) bounding shape prediction model. The method further includes updating the 3D bounding shape prediction model based on comparison of the predicted 3D bounding shape parameters to the ground truth 3D bounding shape parameters.

These and other implementations of the technology disclosed herein can include one or more of the following features.

In some implementations, the method further includes projecting a simulated infrared projection in the simulated environment. In some of those implementations, generating the 3D point cloud can include: generating a first simulated infrared image that captures the simulated infrared projection from a first point of view; generating a second simulated infrared image that captures the simulated infrared projection from a second point of view; and generating the edge points, of the 3D point cloud, based on the first simulated infrared image and the second simulated infrared image. In some versions of those implementations, generating the edge points based on the first simulated infrared image and the second simulated infrared image includes generating an edge-depth image based on pixels, of the first infrared image and the second infrared image, determined to correspond to edges of the simulated object. In some additional or alternative versions of those implementations, the given simulated object includes one or more transparent portions modeled as transparent in the simulated environment, and projecting the simulated infrared projection includes projecting the simulated infrared projection at least partially through the one or more transparent portions of the given simulated object.

In some additional or alternative versions of those implementations, generating the 3D point cloud includes including only the edge points in the 3D point cloud.

In some implementations, generating the 3D point cloud includes including only the edge points in the 3D point cloud.

In some implementations, generating the 3D point cloud includes generating the edge points, of the 3D point cloud, based on ground truth 3D points, of the simulated object, that are determined to correspond to edges when viewed from the point of view.

In some implementations, the method further includes rendering a color image in the simulated environment, and processing the color image to generate a two-dimensional (2D) bounding box for the object. In some of those implementations, generating the 3D point cloud for the simulated object includes selecting candidate 3D points, for potential inclusion in the 3D point cloud, based on the candidate 3D points corresponding to the 2D bounding box. In some versions of those implementations, generating the 3D point cloud for the simulated object includes segmenting out one or more of the candidate 3D points.

In some implementations, a method implemented by one or more processors of a robot is provided and includes capturing a first image that captures, from a first point of view, one or more objects in an environment of the robot. The method further includes capturing a second image that captures the one or more objects from a second point of view. The method further includes generating an edge-depth image that includes first corresponding edge-depth values for only detected edges in the first image and the second image. The method further includes generating a 3D point cloud for a given object of the one or more objects. Generating the 3D point cloud is based on the corresponding edge-depth values determined to correspond to the given object. The method further includes generating a 3D bounding shape for the given object, where generating the 3D bounding shape includes processing the 3D point cloud using a three-dimensional (3D) bounding shape prediction model. The method further includes controlling one or more actuators of the robot based on the 3D bounding shape.

These and other implementations of the technology disclosed herein can include one or more of the following features.

In some implementations, the first image is captured by a first color sensor (e.g., a red, green, blue (RGB) sensor), and the second image is captured by the first color sensor or a second color sensor (e.g., RGB sensor).

What is claimed is:

1. A method implemented by one or more processors, the method comprising:
generating, based on simulated data from a simulator simulating a simulated environment that includes a given simulated object, a three-dimensional (3D) point cloud for the simulated object, wherein generating the 3D point cloud comprises:
including, in the 3D point cloud, edge points determined to correspond to edges of the one or more simulated objects, as determined from a perspective of one or more simulated depth sensors;
generating ground truth 3D bounding shape parameters based on the simulated data, the ground truth 3D bounding shape parameters defining a size, location, and orientation of a 3D bounding shape that encompasses the given simulated object;
generating predicted 3D bounding shape parameters for the given object, wherein generating the predicted 3D bounding shape parameters comprises processing the 3D point cloud using a three-dimensional (3D) bounding shape prediction model to generate the predicted 3D bounding shape parameters as output of the 3D bounding shape prediction model; and
updating the 3D bounding shape prediction model based on comparison of the predicted 3D bounding shape parameters to the ground truth 3D bounding shape parameters.

2. The method of claim 1, further comprising projecting a simulated infrared projection in the simulated environment, and wherein generating the 3D point cloud comprises:
generating a first simulated infrared image that captures the simulated infrared projection from a first point of view;
generating a second simulated infrared image that captures the simulated infrared projection from a second point of view; and
generating the edge points, of the 3D point cloud, based on the first simulated infrared image and the second simulated infrared image.

3. The method of claim 2, wherein generating the edge points based on the first simulated infrared image and the second simulated infrared image comprises:
generating an edge-depth image based on pixels, of the first infrared image and the second infrared image, determined to correspond to edges of the simulated object.

4. The method of claim 2, wherein the given simulated object includes one or more transparent portions modeled as transparent in the simulated environment, and wherein projecting the simulated infrared projection comprises projecting the simulated infrared projection at least partially through the one or more transparent portions of the given simulated object.

5. The method of claim 2, wherein generating the 3D point cloud comprises including only the edge points in the 3D point cloud.

6. The method of claim 1, wherein generating the 3D point cloud comprises including only the edge points in the 3D point cloud.

7. The method of claim 1, wherein generating the 3D point cloud comprises generating the edge points, of the 3D point cloud, based on ground truth 3D points, of the simulated object, that are determined to correspond to edges when viewed from the point of view.

8. The method of claim 1, further comprising:
rendering a red, green, blue (RGB) image in the simulated environment; and
processing the RGB image to generate a two-dimensional (2D) bounding box for the object;
wherein generating the 3D point cloud for the simulated object comprises selecting candidate 3D points, for potential inclusion in the 3D point cloud, based on the candidate 3D points corresponding to the 2D bounding box.

9. The method of claim 8, wherein generating the 3D point cloud for the simulated object comprises segmenting out one or more of the candidate 3D points.

10. A system comprising:
memory storing instructions;
one or more processors operable to execute the instructions to
generate, based on simulated data from a simulator simulating a simulated environment that includes a given simulated object, a three-dimensional (3D) point cloud for the simulated object, wherein in generating the 3D point cloud one or more of the processors are to:
include, in the 3D point cloud, edge points determined to correspond to edges of the one or more simulated objects, as determined from a perspective of one or more simulated depth sensors;
generate ground truth 3D bounding shape parameters based on the simulated data, the ground truth 3D bounding shape parameters defining a size, location, and orientation of a 3D bounding shape that encompasses the given simulated object;
generate the predicted 3D bounding shape parameters for the given object, wherein in generating the predicted 3D bounding shape parameters one or more of the processors are to process the 3D point cloud using a three-dimensional (3D) bounding shape prediction model to generate the predicted 3D bounding shape parameters as output of the 3D bounding shape prediction model; and
update the 3D bounding shape prediction model based on comparison of the predicted 3D bounding shape parameters to the ground truth 3D bounding shape parameters.

11. The system of claim 10, wherein one or more of the processors are further operable to execute the instructions to project a simulated infrared projection in the simulated environment, and wherein in generating the 3D point cloud one or more of the processors are to:
generate a first simulated infrared image that captures the simulated infrared projection from a first point of view;
generate a second simulated infrared image that captures the simulated infrared projection from a second point of view; and
generate the edge points, of the 3D point cloud, based on the first simulated infrared image and the second simulated infrared image.

12. The system of claim 10, wherein in generating the edge points based on the first simulated infrared image and the second simulated infrared image, one or more of the processors are to:
generate an edge-depth image based on pixels, of the first infrared image and the second infrared image, determined to correspond to edges of the simulated object.

13. The system of claim 10, wherein the given simulated object includes one or more transparent portions modeled as transparent in the simulated environment, and wherein in projecting the simulated infrared projection, one or more of the processors are to:

project the simulated infrared projection at least partially through the one or more transparent portions of the given simulated object.

14. The system of claim 10, wherein in generating the 3D point cloud one or more of the processors are to include only the edge points in the 3D point cloud.

15. The system of claim 10, wherein in generating the 3D point cloud one or more of the processors are to include only the edge points in the 3D point cloud.

16. The system of claim 10, wherein generating the 3D point cloud one or more of the processors are to generate the edge points, of the 3D point cloud, based on ground truth 3D points, of the simulated object, that are determined to correspond to edges when viewed from the point of view.

17. The system of claim 10, wherein one or more of the processors are further operable to execute the instructions to:

render a red, green, blue (RGB) image in the simulated environment; and process the RGB image to generate a two-dimensional (2D) bounding box for the object;

wherein in generating the 3D point cloud for the simulated object one or more of the processors are to select candidate 3D points, for potential inclusion in the 3D point cloud, based on the candidate 3D points corresponding to the 2D bounding box.

18. The system of claim 10, wherein in generating the 3D point cloud for the simulated object one or more of the processors are to segment out one or more of the candidate 3D points.

* * * * *